June 6, 1967     D. F. REAHARD ET AL     3,323,256

SEALING GASKET OF COMBINED RIGID AND FLEXIBLE EXTRUSIONS

Filed April 2, 1965

INVENTORS
DANIEL F. REAHARD
BY RAYMOND COWLES

Bosworth, Sessions,
Herrstrom & Knowles
ATTORNEYS

3,323,256
SEALING GASKET OF COMBINED RIGID AND FLEXIBLE EXTRUSIONS

Daniel F. Reahard and Raymond Cowles, Seymour, Ind., assignors to The H. O. Canfield Co., Inc., Seymour, Ind., a corporation of Indiana
Filed Apr. 2, 1965, Ser. No. 445,211
6 Claims. (Cl. 49—478)

ABSTRACT OF THE DISCLOSURE

A sealing gasket for use with a closure including a retainer strip formed of a relatively rigid plastic and having an elongated body adapted to be secured to the closure, a separately formed, elongated, relatively flexible sealing strip having a body that is U-shaped in cross-section. The retainer strip and the sealing strip have interfitting portions for securing the sealing strip to the retainer strip disposed respectively along one edge of retainer strip and extending longitudinally and inwardly from one leg of the U-shaped sealing strip. The sealing strip has a sealing portion that is held firmly in engagement with the member on which the retainer strip is mounted by the interfitting portion of said retainer strip, and has another sealing portion that is adapted to engage another member. The interfitting portions include a pair of opposed lead portions on one of said strips defining a groove, and a tongue adapted to fit within said groove and a closure engaging loop on the other of said strips, which loop applies pressure to one of said leg portions when the gasket is installed to thereby increase the frictional engagement between the strips.

---

This invention relates to sealing gaskets and more particularly to a sealing gasket formed from a combination of a rigid and a flexible extrusion. While gaskets embodying the invention may advantageously be employed for various purposes, they provide exceptional advantages when used in refrigerator cabinets between the doors and the frames. Hence, they will be discussed in connection with such use.

Accordingly, it is an object of this invention to provide an improved sealing gasket for a closure.

Another object of this invention is to provide a sealing gasket which is relatively simple and economical in construction.

Yet another object of this invention is to provide an improved, more economical, sealing gasket formed of a relatively flexible sealing portion and a separately formed rigid retainer portion and having a construction such that the combination can be quickly and easily assembled.

Still a further object of this invention is to provide an improved sealing gasket formed of a relatively flexible sealing portion having a depending longitudinal tongue and a separately formed rigid retainer strip portion having a U shaped notch extending longitudinally of one edge of the retainer strip for receiving the tongue.

Briefly, in accordance with aspects of this invention, we provide a sealing gasket with a sealing strip having a cross-section in the form of an inverted U and with a holding and sealing flange extending along the length of the sealing strip and projecting from one arm of the U across a portion of the opening defined between the arms of the U. Advantageously, the sealing strip has an inwardly projecting tongue portion extending along its length projecting inwardly from the same arm of the U as the holding and sealing flange and in spacial relationship thereto. We also provide a sealing strip engaging retainer strip of relatively rigid material which can be secured to the door facing, which retainer strip has a substantially flat, elongated body, one edge of which is formed integrally with a pair of parallel leg portions. Preferably, one of the leg portions is thicker than the other of the leg portions and, in its unstressed state, at least one of the leg portions depends from and extends substantially parallel to the main body portion of the retainer strip for facilitating the entry of the tongue portion of the sealing strip between the leg portions. The sealing strip may be provided with an elongated magnetic supporting portion resiliently supported in spacial relationship relative to the inverted U shaped body of the sealing strip. The retainer strip or supporting strip is notched or punched to receive suitable fasteners such as screws.

The terms "rigid" and "flexible" as employed herein are intended to encompass strips of different Durometer ranges. In one illustrative embodiment of this invention, two strips were measured on a Shore Durometer. The soft strip was measured on the A scale and produced a reading in the range of 55 to 75. The rigid strip was measured on the D scale and produced a reading in the range of 75 to 85. It is also within the scope of this invention to employ two strips having overlapping Durometer ranges.

In accordance with yet other aspects of this invention, we provide a sealing gasket with a resilient sealing strip having a first Durometer range and a rigid, substantially coextensive plastic strip having a different Durometer range, the strips having a tongue and groove type mating relationship, the rigid strip having a longitudinal portion L shaped in cross-section adjacent the groove to prevent bowing of the strip between fasteners.

In accordance with yet other aspects of this invention, we provide a sealing gasket with a combination of a rigid retainer strip and a resilient sealing strip which sealing strip, in cross-section, has an inverted U-shaped body portion in which one of the legs of the U-shaped portion is longer than the other of the legs. The longer leg has a longitudinal tongue extending in a direction of the shorter leg; an elongated longitudinal loop portion projecting in the direction of the shorter leg and a lobe portion extending outwardly from the edge of the longer leg in the direction away from the shorter leg. The rigid retainer strip is elongated and has a pair of legs projecting angularly from one edge and extending longitudinally of the edge to receive the tongue portion of the sealing strip. Advantageously, we provide one of the legs with a smaller cross-section than the other leg and a longitudinal, angularly projecting lip portion depending from the smaller leg portion away from the larger leg portion to engage the loop portion of the sealing strip to insure a good sealing relationship between the loop portion and the closure member and to insure adequate frictional engagement between the retainer strip and the tongue of the sealing strip. In accordance with still other aspects of this invention, we provide a retainer strip having a plurality of longitudinal ribs depending from a substantially flat side thereof on the same side as the smaller leg portion for defining an improved seal with the closure facing and for preventing the retainer strip from adhering to the base of the closure member.

It is a feature of this invention to provide a sealing gasket formed of a pair of members including a retainer strip which is relatively rigid and formed of a substantially flat body portion having a pair of leg portions depending from one side and a relatively resilient sealing strip having a body portion which is substantially U-shaped in cross-section and is provided with a longitudinal tongue portion which projects inwardly relative to the U-shaped cross-section for frictionally engaging both legs of the retainer strip. Preferably, the tongue portion is provided with a lobe or enlarged terminal portion remote from the leg of the U-shaped portion from which it depends. A mating surface for the tongue portion is formed between the leg portions of the retainer strip. In accordance with one specific example, the tongue portion is provided with a neck portion joining one leg of the body of the sealing strip, which neck portion is formed with a pair of outwardly facing concave surfaces. The neck portion joins the lobe portion which in this particular instance is substantially cylindrical in cross-section and is formed integrally with the neck portion. The retainer strip is provided with a pair of longitudinal leg portions depending from opposite surfaces of one edge of the body of the retainer strip which leg portions are formed with opposed arcuate faces or surfaces which matingly engage the lobe portion and the neck portions of the tongue portion of the sealing strip. Preferably, the leg portion which is positioned outwardly relative to the door facing has a larger cross-section than the leg portion which is positioned inwardly relatively to the door facing such that the thinner leg portion is more flexible and is preferably initially extruded with the thin leg portion prejecting angularly away from the center line of the retainer strip to facilitate the insertion of the tongue portion of the sealing strip into the recess formed between the leg portions.

In accordance with another feature of this invention, the sealing strip is provided with a holding and sealing flange which depends from a terminal portion of one leg of the sealing strip and extends to a region of engagement with the thinner leg portion of the retainer strip when the retainer strip is pulled snugly against the door facing. Thus, the holding and sealing flange seals the area between the edge of the retainer strip and the door facing and assists the securing engagement of the leg portions with the tongue portion by urging the thinner leg portion into a tight frictional engagement with the tongue portion of the sealing strip.

It is another feature of this invention to provide a resilient type sealing gasket including a resilient sealing strip and a rigid retainer strip in which the body of the resilient sealing strip is substantially U-shaped in cross-section, one of the legs of the U being longer than the other leg and having a lobe portion extending away from the shorter leg, a loop portion extending toward the shorter leg and a tongue portion extending toward the shorter leg. Advantageously, the tongue portion is reduced in cross-section adjacent the longer leg and is increased in cross-section outwardly of the reduced portion to matingly engage the surface between a pair of longitudinal legs on one side of the rigid retainer strip securely to connect the sealing strip to the retainer strip. Advantageously, the rigid retainer strip has one leg portion of smaller cross-section than the other leg portion and has a longitudinal lobe portion extending away from the larger leg portion for the purpose of engaging the loop portion of the resilient strip to pivot the smaller leg portion into a position of engagement with one surface of the sealing strip tongue portion. Still a further feature of this invention is to provide a retainer strip of rigid material which cooperates with a sealing strip of resilient materal in which the retainer strip is provided with a plurality of longitudinal ribs projecting from the surface directed toward the closure facing such that the ribs insure a good seal between the retainer strip and the closure facing.

Other objects, features and advantages relate to certain novel features of construction, combinations and arrangements of parts which provide economy in manufacture and operation. The invention is described in connection with the accompanying drawings forming a part of the specification and illustrating embodiments which represent the best known modes of practicing the invention.

Figure 1:
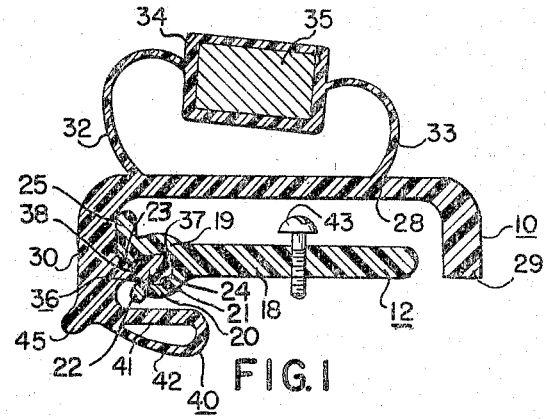
FIG. 1 is a view in elevation, and in section, showing one illustrative embodiment of sealing gasket comprised of a resilient sealing strip and a rigid retainer strip according to this invention in which the sealing gasket is partially installed.
Figure 2:
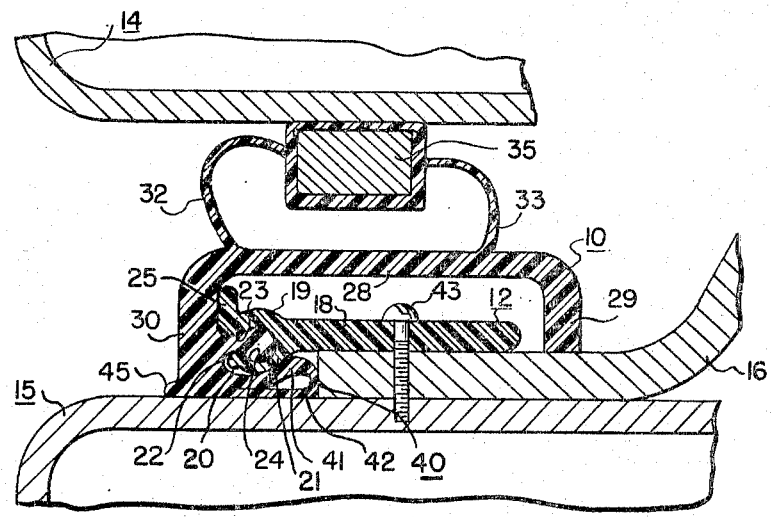
FIG. 2 is a view corresponding to FIG. 1 and showing the sealing gasket completely installed.

Referring now to FIGS. 1 and 2 of the drawing which show one illustrative embodiment of sealing gasket according to this invention which includes a resilient sealing strip 10 and a rigid retainer strip 12, both of which may be formed of polyvinylchloride. This sealing gasket is to be described with application to a refrigerator door in which the seal is to be defined between a metal refrigerator cabinet 14 and the refrigerator door 15. Portions of the door 15 and the cabinet 14 are shown in section in FIG. 2 including an inner door liner 16 in which a retainer strip 12 and a sealing strip 10, in accordance with one embodiment of this invention, define a seal between the cabinet 14 and the door 15.

In FIGS. 1 and 2, the retainer strip 12 is formed with an elongated, relatively flat body portion 18 having a pair of elongated flanges or leg portions 19, 20 projecting from opposed edges of one side of the body portion 18. Advantageously, the cross-sectional area of the leg portion 19 is substantially parallel to the body portion 18 and is much greater than the cross-sectional area of the leg portion 20 such that the leg portion 19 is substantially rigid while the leg portion 20 is more flexible. The leg portion 20, in its unstressed state, has a portion 21 which depends angularly from the center line of the body portion 18 to facilitate the entry therebetween of a mating part. The remaining leg portion 22 extends substantially parallel to body portion 18. The leg portions 19, 20 have a pair of opposed surfaces 23, 24, respectively, which surfaces are substantially S shaped to matingly engage a substantially cylindrical portion of the tongue which depends upon the sealing strip 10, which tongue will be subsequently described. The retainer strip 12 includes a longitudinal tubular stiffening portion 25 depending angularly from the thicker leg 19. Portion 25 engages the inside of sealing strip 10 and acts as a stiffener for preventing bowing of the retainer strip between fasteners.

The sealing strip 10 includes a base member 28 which is generally U shaped in cross-section and has a first flange or leg 29 on the right hand side as viewed in FIGS. 1 and 2 and a second downwardly extending flange or leg 30 on the left hand portion of the base member 28 as viewed in FIGS. 1 and 2. Preferably, the right hand flange or leg 29 is shorter than the flange or leg 30 for purposes which will be subsequently described. A pair of walls 32, 33 depend from the base member 28 and flexibly support a magnet holding tube member 34 which supports a magnet 35. Preferably, the magnet holding tube member 34 is an elongated substantially rectangular section for supporting magnet 35 in a position to magnetically attract and adhere to the metal cabinet 14. The base member 28, the flanges 29, 30, the walls 32, 33 and the magnet holding tube member 34 are preferably integrally formed of relatively flexible material such as the previously mentioned polyvinylchloride. Depending from the flange or leg 30 is an elongated tongue portion 36 which has an outer substantially cylindrical portion 37 connected to the flange or lip 30 by means of a reduced neck portion 38 for matingly engaging the surfaces 23 and 24 of the retainer strip 12.

The base member 28 includes an integral longitudinal lobe-shaped holding and sealing flange 40 which is integrally formed and depends from the flange or leg 30. The holding and sealing flange 40 is formed with a loop, the inner portion of which includes a wall 41 which is thicker than the remaining wall portion 42. When the wall 42 is pulled into engagement with the door 15, it is compressed and the sealing flange 40 is flattened until the wall 42 engages the wall 41 and pushes the wall 41 into engagement with the relatively thin leg portion 20 of the retainer strip 12. This position is shown in detail in FIG. 2. The retainer strip 12 is drawn into this position by a plurality of fastening screws 43 spaced along the length of the body portion 18 and threadably engaging the inner door liner 16. When the holding and sealing flange 40 is pressed into engagement with the leg portion 20, as shown in FIG. 2, the retainer strip 12 securely frictionally engages the tongue portion 36 of the base member 28. The base member 28 includes an elongated lobe portion 45 which projects from the outer edge of the flange or lip 30 to perform a tight sealing engagement with the edge of the door 15.

When the assembled sealing gasket is to be installed, the installer positions the relatively rigid retainer strip 12 adjacent the inner door liner 16 while holding the base member away from rigid strip 12 and threadably engages the screws 43 at intervals along the body portion of the retainer strip 12. The operator then rotates the screws 43 to pull the body portion 18 of the retainer strip 12 into snug engagement with the inner door liner 16 such that the holding and sealing flange 40 presses against the thinner leg portion 20 of the retainer strip 12 thereby bending the thinner leg portion 20 into tight frictional engagement with the tongue 36. The installer then releases the inner edges or flanges 29 of the base member 28 and the resilience of this member forces the flange or leg 29 into engagement with the door liner 16. The installation is now complete and the magnet holding tube member 34 positions the magnet 35 in a position to engage the cabinet 14. If a portion of either the sealing strip 10 or strip 12 becomes damaged, the entire gasket may be quickly and easily removed by first holding the flange or leg 29 out of a position of alignment with the flange 30 to thus expose the screws 43 and permit these screws to be removed from the inner door liner 16. The repairman then positions a new gasket adjacent the closure facing, inserts and tightens the screws in a manner previously described.

Figure 3:
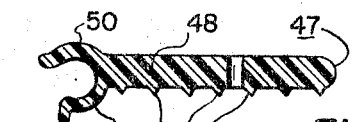
FIG. 3 is a view in section of an alternative embodiment of retainer strip in an unstressed state.
Figure 4:
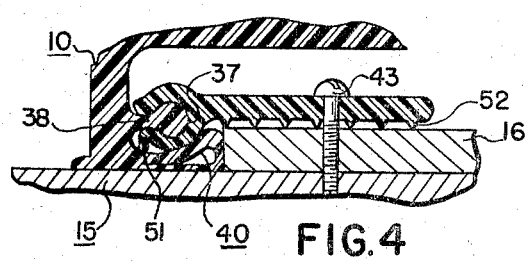
FIG. 4 is a fragmentary view in section of a sealing gasket formed from a combination of the sealing strip of FIGS. 1 and 2 and the retainer strip of FIG. 3.
Figure 6:
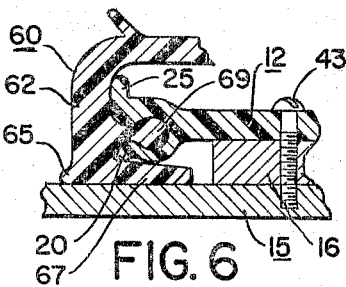
FIG. 6 is a fragmentary view in section of the leg of the sealing strip and a portion of the retaining strip of FIG. 5 as completely installed.

FIGS. 3 and 4 are views in section showing an alternative embodiment of retainer strip and its cooperation with a resilient sealing strip 10, shown in FIGS. 1 and 2. FIG. 3 shows an alternative embodiment of retainer strip 47 which is similar to the retainer strip 18 of FIGS. 1 and 2 except that the retainer strip 47 has legs 49, 50 in which leg 49 is provided with a lobe portion 51 projecting outwardly from the end of the narrower leg portion 49 and away from the thicker leg portion 50, and a plurality of longitudinally extending wedge-shaped ribs or ridges 52 extend from the body portion 48 and define a snug sealing engagement with the liner 16 as shown in FIG. 4. Stated in another manner, the ribs or ridges 52 prevent the retainer strip 47 from bridging "lands" along the surface of the door liner 16 to thus insure a good sealing relationship between the retainer strip 47 and the door liner 16. FIG. 4 shows the retainer strip 47 in its compressed state in which the lobe portion 51 engages the loop 40 of the sealing strip 10 securely to frictionally engage the surfaces o fthe substantially cylindrical portion 37 and a reduced neck portion 38 of the tongue 36 projecting from the inner surface of the leg 30 of the sealing strip 10.

Figure 5:
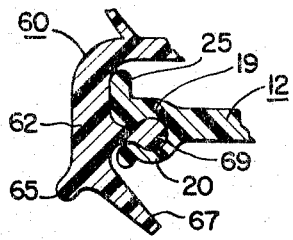
FIG. 5 is a fragmentary view, in section, of one leg of another embodiment of sealing strip and a portion of a retainer strip both in an unstressed condition.

FIG. 5 is a fragmentary view in section of portions of another illustrative embodiment of sealing gasket according to this invention, showing the assembled gasket prior to installation. The portions of the gasket which are not shown may be identical to the embodiment shown in FIGS. 1 and 2. In FIG. 5, a sealing strip 60 includes a leg 62 having a longitudinal lobe portion 65 projecting angularly from one edge of leg 62 and a solid, sealing flange 67 projects angularly from the opposite edge of leg 62. A longitudinal tongue 69 depends from the leg 62 on the side opposite the lobe portion 65. When the sealing gasket is secured in position on the door 15 by means of fasteners 43, the sealing flange 67 compresses between the door 15 and mounting strip leg 20 and bends leg 20 snugly against tongue 69.

From the foregoing description, it is apparent that the scraps recovered in manufacturing both the relatively resilient sealing strip 10 and the relatively rigid retainer strips 12 and 47 can be recovered and reused. This sealing gasket is quickly and easily installed and replaced if either element is worn or damaged. Further, with this arrangement, the sealing strip 10 is securely held in place, not only by the cooperation of the tongue 36 and legs 19, 20 or 49, 50, but also by the cooperation of the sealing loop 40 and legs 20 or 49 which press the legs 40 against the door liner 16.

In accordance with the patent statutes, the principles of the present invention may be utilized in various ways, numerous modifications and alterations being contemplated, substitution of parts and changes in construction being resorted to as desired, it is understood that the embodiments shown in the drawings and described above are merely for purposes of explanation and illustration without intention to limit the scope of the claims to the specific details disclosed.

What is claimed is:

1. A sealing gasket for use in a closure comprising:
   a resilient elongated sealing strip, U-shaped in cross-section with a longitudinally extending tongue portion projecting from one leg member of said U toward the other leg member of said U, and
   a support strip formed of a flat, rigid, elongated body portion having, in cross-section, a pair of opposed, longitudinal leg portions each projecting from one edge thereof, said leg portions frictionally engaging said tongue portion, one of said strips including means for applying pressure to one of said leg portions when said gasket is mounted to thereby increase the frictional engagement between said leg portions and said tongue portions.

2. A sealing assembly for use in a door, window or the like comprising:
   an elongated rigid retainer strip; and
   a resiilent sealing strip, one of said strips having a longitudinal tongue portion depending therefrom, said tongue portion having a first and second section, said first section being connected to said strip and having a smaller cross-sectional area than said second section, said second section being connected to said strip by said first section; the other of said strips having a pair of opposed leg portions thereon defining a notch therebetween to receive said tongue portion, one of said leg portions having a relatively small cross-section to permit said one leg portion to be flexed to increase the frictional engagement between said leg portions and said tongue portions when said sealing assembly is mounted, said second section of said tongue portion having a thickness substantially equal to the maximum width of said notch when said one leg portion is in the unstressed state, and means for applying pressure to said one leg portion when said assembly is mounted to thereby increase the frictional engagement between said leg portions and said tongue portion.

3. A sealing gasket for use in a door, window or the like comprising:
- a support strip formed of a flat, rigid, elongated body portion having a pair of opposed, longitudinal leg portions projecting from one edge thereof; and
- a resilient, elongated sealing strip, U shaped in cross-section with a longitudinally extending tongue portion projecting from one leg member of said U toward the other leg member of said U and frictionally engaging said leg portions of said support strip; one of said leg portions having a thickness less than that of the other of said leg portions to permit said one leg portion to be bent toward said other leg portion and wherein said sealing strip includes means for applying a bending force to said one leg portion.

4. A sealing gasket for use in a door, window or the like, comprising:
- a support strip formed of a flat, rigid, elongated body portion having a first Durometer range and having a pair of opposed, longitudinal leg portions projecting from one edge thereof; and
- a resilient, elongated sealing strip having a second Durometer range, U shaped in cross-section with a longitudinally extending tongue portion projecting from one leg member of said U toward the other leg member of said U and frictionally engaging said leg portions of said support strip, one of said leg portions having a thickness less than that of the other of said leg portions to permit said one leg portion to be bent toward said other leg portion and wherein said sealing strip includes sealing strip means for applying a bending force to said one leg portion.

5. A sealing gasket comprising:
- a substantially flat, rigid retainer strip for providing support for the gasket, said strip having a pair of opposed leg portions extending along one side thereof, one of said leg portions having a larger cross-section than the other of said leg portions, said one leg portion having a longitudinal stiffening flange thereon; and
- a resilient sealing strip including,
    - a generally U shaped body portion having a longitudinal tongue thereon positioned between said leg portions,
    - a magnet supporting member,
    - a pair of resilient walls supporting said magnet supporting member on said body portion, and
    - sealing flange means for frictionally engaging one of said leg portions for forcing said one leg portion into engagement with said tongue.

6. A sealing gasket comprising:
- a substantially flat, retainer strip having a first Durometer range for providing support for the gasket, said strip having a pair of opposed leg portions extending along one side thereof, one of said leg portions having a larger cross-section than the other of said leg portions; and a
- sealing strip having a second Durometer range lower than said first range including,
    - a body portion having a U shaped cross-section which includes a pair of legs, the ends of which engage a closure member,
    - a magnet supporting member,
    - a pair of resilient walls supporting said magnet supporting member on said body portion,
    - means for frictionally engaging said leg portions for supporting said sealing strip on said retainer strip including a tongue portion projecting from the intermediate portion of one of said legs toward the other of said legs and positioned between said leg portions, and
    - a sealing longitudinal flange depending from one edge of one of said legs to engage one of said leg portions.

References Cited

UNITED STATES PATENTS

| | | | |
|---|---|---|---|
| 2,958,912 | 11/1960 | Bower et al. | 49—478 |
| 3,126,589 | 3/1964 | Monti | 49—482 |
| 3,138,833 | 6/1964 | Neuman | 49—478 |
| 3,159,885 | 12/1964 | Cowles | 49—489 X |
| 3,226,367 | 12/1965 | Monti | 49—489 X |

DAVID J. WILLIAMOWSKY, *Primary Examiner.*

HARRISON R. MOSELEY, *Examiner.*

P. C. KANNAN, *Assistant Examiner.*